May 17, 1966 MASUMI ATSUKAWA ETAL 3,251,649
PROCESS OF PRODUCING SULFURIC ACID
Filed Feb. 25, 1963
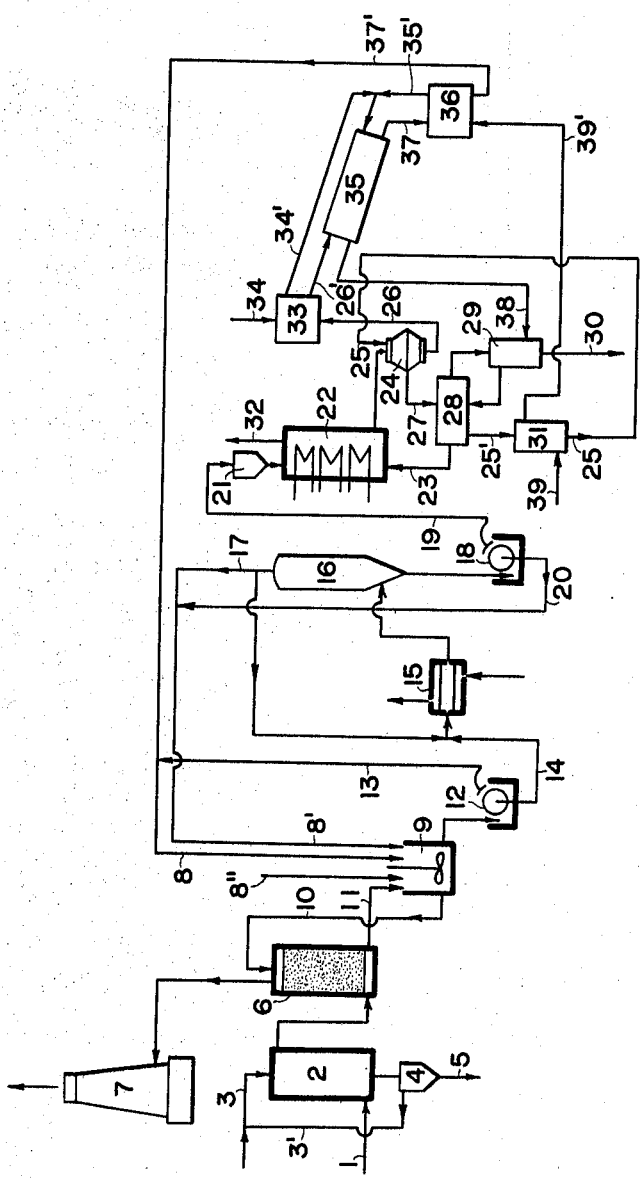

United States Patent Office 3,251,649
Patented May 17, 1966

3,251,649
PROCESS OF PRODUCING SULFURIC ACID
Masumi Atsukawa and Kazuhiro Matsumoto, Hiroshima, and Yoshihiro Shiraishi, Asa-gun, Hiroshima Prefecture, Japan, assignors to Mitsubishi Shipbuilding & Engineering Company Limited, Tokyo, Japan
Filed Feb. 25, 1963, Ser. No. 260,442
Claims priority, application Japan, Feb. 28, 1962, 37/7,280
8 Claims. (Cl. 23—167)

This invention relates to a process of treating a waste gas containing sulfur oxide with an absorbent, manganese oxide to render the waste gas harmless and more particularly to a process of producing sulfuric acid from such a waste gas with manganese oxide regenerated.

As well known, waste gases discharged from metal refining plants, chemical plants, power stations, etc. contain sulfur oxide such as sulfur dioxide or trioxide which is typical of harmful materials causing injury to the public. Nevertheless such sulfur oxide is one of useful materials as a raw material in the field of chemical industry. Various attempts have been heretofore proposed to economically remove sulfur oxide from the waste gases and at present several of them are actually practical under certain limited conditions of location.

On the other hand, in power stations from which the waste gases referred to are discharged in large amounts and which cause great injury to the public in view of their conditions of location high capacity boilers equipped therein are progressively switching from the coal burning type to the oil burning type in recent years. The use of any heavy oil from the Middle and Near East districts including a high content of sulfur results in a far higher concentration of sulfur oxide in the combustion gas as compared with the case where coal is burned. In addition, a capacity for each boiler is high. It will be, therefore, appreciated that, if the combustion gas would be exhausted to the surrounding atmosphere without the same subjected to any suitable treatment then the public injury will inevitably occur. Also it is thought that the application of any of the previously proposed treatment processes to factories from which waste gases including high contents of sulfur oxide are exhausted has disadvantages and is difficult unless such processes will be modified or improved.

More specifically, as any of the power stations discharges extremely high amount of a waste gas such as above described the total amount of sulfur oxide contained in the waste gas will become enormous in spite of a relatively low content of the same. Thus any absorbent for absorbing sulfur oxide is preferably one capable of being regenerated and repeatedly used. However, the prior art practice has disadvantages such as the complication of the stage of regenerating the absorbent, the use of expensive absorbents accompanied by a considerable portion of the same lost at the absorption stage, and the like. Further there is another disadvantage that any of the conventional process by which an absorbent can be regenerated is required to comprise additionally the step of preparing sulfuric acid for the reason that concentrated sulfur dioxide is recovered. It is very desirable to remove economically and efficiently sulfur oxide from waste gases to render the same harmless and simultaneously to regenerate absorbents for absorbing sulfur oxide at low costs and with high yields.

Accordingly, it is the chief object of the invention to provide a novel and improved process of treating a waste gas containing sulfur oxide with an absorbent, manganese oxide to absorb sulfur oxide by the absorbent to render the waste gas harmless and regenerating the absorbent at low costs and with a high yield.

It is another object of the invention to provide a novel and improved process as described in the preceding paragraph and producing commercially valuable sulfuric acid at the stage of regenerating the absorbent.

It is a further object of the invention to provide a novel and improved process as described in the chief object and regenerating hydrogen chloride which is required to regenerate the absorbent, at the stage of regenerating the same by conversion reaction for the purpose of repeatedly using hydrogen chloride.

According to the principle of the invention water is added to manganese oxide to form an aqueous suspension of the latter having a concentration sufficient to maintain the fluidity of the suspension. This aqueous suspension is caused to contact such gas as a waste gas containing sulfur oxide to absorb and remove sulfur oxide from the gas. Thus the waste gas free from sulfur oxide and can be exhausted to the surrounding atmosphere as a harmless gas. Manganese sulfate produced in the absorption step is reacted with hydrogen chloride or a gas containing the same at a reaction temperature not exceeding 50° C. and preferably at room temperature to produce sulfuric acid while depositing manganous chloride in crystalline form. Then manganous chloride thus deposited is oxidized and decomposed or oxidation decomposed at a temperature of from 350° to 600° C. to be converted into hydrogen chloride and manganese oxide. This manganese oxide may be advantageously used to form the aqueous suspension as above described.

Preferably the deposited manganese chloride may be oxidation decomposed with a gas containing oxygen in the presence of water vapor at a temperature of from 350° to 600° C. to be converted into hydrogen chloride and manganese oxide. Hydrogen chloride thus recovered may be used for the production of manganese chloride from manganese sulfate while manganese oxide may be used for the preparation of the aqueous suspension as previously described.

Advantageously, sulfuric acid separated from manganese chloride may be contacted, in counter current relationship with a hot, hydrogen chloride-containing gas produced in the step of oxidation decomposing manganous chloride, in order to escape or strip hydrogen chloride dissolved in sulfuric acid from the same and simultaneously to concentrate sulfuric acid.

In order to prevent the stripped solution of sulfuric acid from being diluted with water condensed and separated from the hot gas, the latter may preferably leave the stripping stage at its temperature above the dew point of the gas. After having stripped hydrogen chloride from the solution of sulfuric acid the gas can transfer heat to sulfuric acid before it is subject to stripping, within an indirect heat exchanger.

The invention will become more readily apparent from the following detailed description taken in conjunctinon with the accompanying drawing wherein a single figure illustrates an apparatus suitable for use in practicing the invention with the flows of various materials indicated by solid lines.

The process according to the invention comprises broadly the steps of absorbing sulfur oxide contained in a gas such as a waste gas to be treated, by an aqueous suspension of manganese oxide to produce manganese sulfate, depositing and separating manganese sulfate from the resulting absorbent solution, reacting the separated manganese sulfate with hydrogen chloride to convert the sulfate into sulfuric acid and manganous chloride, separating sulfuric acid from the deposited manganous chloride and thereafter removing hydrogen chloride dissolved in sulfuric acid from the same, and regenerating hydrogen chloride and manganese oxide from manganese chloride in the presence of oxygen and water vapor.

The step of absorbing sulfur oxide or the first step is to scrub a gas such as a waste gas containing sulfur oxide with an aqueous suspension of manganese oxide to absorb sulfur oxide such as sulfur dioxide ($SO_2$) and sulfur trioxide ($SO_3$) by the latter. To this end, any suitable manganese oxide such as manganese dioxide ($MnO_2$), manganese sesquioxide ($Mn_2O_3$), trimanganese tetroxide ($Mn_3O_4$) or the like or any mixture thereof is suspended into water. A concentration of manganese oxide suspended in the resulting liquid absorbent scarcely affects the absorption factor of the absorbent for sulfur oxide but it may be preferably about 30% or less in view of the fluidity of the liquid.

Manganese oxide absorbs sulfur oxide to produce manganese sulfate and simultaneously to refer the treated gas harmless. Dependent upon compositions of a gas to be treated and a liquid absorbent, a reaction will proceed in accordance with some of the following chemical equations.

$$2MnO_2 + 3SO_2 \rightarrow MnSO_4 + MnS_2O_6$$
$$Mn_2O_3 + 2SO_2 \rightarrow MnSO_4 + MnSO_3$$
$$Mn_3O_4 + 3SO_2 \rightarrow MnSO_4 + 2MnSO_3$$
$$MnO_2 + SO_3 \rightarrow MnSO_4 + \tfrac{1}{2}O_2$$
$$Mn_2O_3 + 3SO_3 \rightarrow Mn_2(SO_4)_3$$
$$Mn_3O_4 + 4SO_3 \rightarrow MnSO_4 + Mn_2(SO_4)_3$$
$$MnSO_3 + \tfrac{1}{2}O_2 \rightarrow MnSO_4$$
$$Mn_3O_4 + 2SO_3 \rightarrow MnSO_4 + MnO_2$$
$$Mn_2O_3 + SO_3 \rightarrow MnSO_4 + MnO_2$$
$$Mn_2(SO_4)_3 \rightarrow 2MnSO_4 + SO_2 + O_2$$

The aqueous suspension of manganese oxide or liquid absorbent may advantageously have its operating temperature ranging from approximately room temperature to 100° C. For the satisfactory results it has been found, however, that the temperature is preferably 75° C. or less. If the temperature of the liquid absorbent will be higher than the value as above specified, its absorption factor is greatly reduced. Accordingly, if a gas to be treated will be at an elevated temperature the same is required to be preliminarily cooled.

As previously pointed out, the reaction products depend upon the compositions of the gas to be treated and the liquid absorbent. Because manganese ions are high in activity of catalytic oxidation, sulfur dioxide ($SO_2$) will be oxidized with oxygen contained in the gas to produce some amount of sulfuric acid. The catalytic action of manganese ions is desirable for the reason of accelerating absorption reaction. However, in order to prevent any absorber device used from being corroded by sulfuric acid thus produced, any suitable manganese oxide of lower order such as trimanganese tetroxide ($Mn_3O_4$), manganese sesquioxide ($Mn_2O_3$) or the like or a mixture thereof may be preferably increased in an amount for the purpose of converting the produced sulfuric acid into a sulfate in accordance with either or both of the following two equations:

$$2H_2SO_4 + Mn_3O_4 \rightarrow 2MnSO_4 + MnO_2 + 2H_2O$$

and $$H_2SO_4 + Mn_2O_3 \rightarrow MnSO_4 + MnO_2 + H_2O$$

In this case it is noted that manganese dioxide thus produced may be separated from the resulting solution and then mixed with manganous chloride in the fifth steps as will be described hereinafter for the purpose of aiding in producing hydrogen chloride. For this reason the catalytic oxidation effected in the first step of the present process will be rather favorable in contrast to the conventional process which comprise the step of regenerating an absorbent and in which any oxidation effected in the absorption step is unfavorable.

As an example, a gas comprising, by volume, 0.2% $SO_2$, 3% $O_2$, 12.5% $CO_2$, 8.5% $H_2O$ and the balance being $N_2$ and substantially corresponding in composition to a waste gas discharged from a power station of oil burning type was passed through an absorber device of impinging type where the same was scrubbed with an aqueous suspension of manganese sesquioxide. The tests were conducted at 50°, 70° and 90° C. respectively with the gas brought into contact with the aqueous suspension for 1.21 seconds. The results obtained are listed in the following table.

*Table*

| Temperature in ° C | 50 | | | | 70 | 90 |
|---|---|---|---|---|---|---|
| Concentration of aqueous suspension in percent | 10 | 20 | 30 | 40 | 30 | 30 |
| Recovery of $SO_2$ in percent | 61 | 61 | 61 | 63 | 63 | 36 |

A continuous test was conducted for 90 hours with an absorber tower 60 millimeters in diameter and 2,000 millimeters in height and including wooden grids filled up therein. A tested gas comprised, by volume, 0.17% $SO_2$, 11.7% $CO_2$, 2.8% $O_2$, 14.2% $H_2O$ and the balance $N_2$ and a liquid absorbent having a concentration of 8% by weight of manganese oxide was maintained within a range of from 45° to 50° C. 65% of sulfur dioxide was absorbed by the absorbent with the result that a solution was yielded comprising by weight, 24.3% $MnSO_4$, 0.9% $MnS_2O_6$ and 0.8% $H_2SO_4$ except for solids.

The next or second step is to deposit and separate manganese sulfate from a solution yielded in the first step as above described. The solution obtained after the absorption step comprises a high amount of manganese sulfate, very low amounts of manganese dithionate and free sulfuric acid and a not-reacted portion of manganese oxide suspended in the same. The not-reacted portion of manganese oxide is first filtered out and then returned back to the absorption step for the purpose of re-using the same. By taking advantage of the solubility of manganese sulfate decreasing with an increase in temperature of a solution, the resulting filtrate is heated to deposit or crystallize and separate manganese sulfate from a solution including manganese dithionate which, in turn, may be fed back to the first or absorption step.

In the third step manganese sulfate separated as above described is reacted with hydrogen chloride to be converted into sulfuric acid and manganous chloride. This reaction may be preferably effected in a multistage reactor vessel of counter current type and is expressed by the following equation $$MnSO_4 \cdot 4H_2O + 2HCl \rightarrow MnCl_2 \cdot 4H_2O + H_2SO_4$$

It will be noted that the figure as to water of crystallization for manganous chloride depends upon the reaction temperature at which the chloride is produced.

More specifically, when hydrogen chloride is continued to be brown in through the solution including manganese sulfate suspended in sulfuric acid, the concentration of sulfuric acid will be increased as the reaction proceeds. However, manganese sulfate is gradually consumed. At the same time, the solubility of manganese sulfate is also decreased so that the concentration of the slurry of manganese sulfate is not reduced proportionally to the proceeding of the reaction. On the other hand, manganous chloride is progressively increased in concentration and precipitated provided that the concentration will exceed its value of saturation. However, an increase in the concentration of sulfuric acid is accompanied by a decrease in the solubility of hydrogen chloride which, in turn, is accompanied by an increase in the solubility of manganous chloride. Thus the concentration of the slurry of manganous chloride is not increased proportionally to the proceeding of the reaction. In this way, the reaction velocity is gradually decreased until the reaction will terminate at a certain value of the concentration of sulfuric acid determined by both a partial pressure of hydrogen chloride and the reaction temperature. It has been found that the reaction temperature should be 50° C. or less and preferably adjacent room temperature with the satisfactory results. It is to be noted, as the reaciton is exothermic effective cooling means be essentially provided to prevent an increase in reaction temperature. In addition the higher the partial pressure of hydrogen chloride the better so that it is very desirable to perform the reaction under pressure.

Hydrogen chloride regenerated in the fifth step as will be described hereinafter can be advantageously used as hydrogen chloride participating in the reaction as above described. In this connection, it will be noted that a gas containing hydrogen chloride regenerated in the fifth step may preferably contact the slurry of manganese sulfate in multistage counter-current relationship in order to increase the rate of reaction and to prevent hydrogen chloride from losing.

An experiment conducted at 30° C. and with a partial pressure of 0.2 atmosphere of hydrogen chloride yielded sulfuric acid with its concentration of 62.5%.

The solution thus obtained contains sulfuric acid and crystals of manganous chloride. Sulfuric acid can now be separated from manganous chloride as by using a centrifuge. However, since the separated solution of sulfuric acid includes hydrogen chloride dissolved therein in an amount dependent upon both the partial pressure of hydrogen chloride being reacted and the reaction temperature that hydrogen chloride is necessarily escaped or stripped from the solution.

In the fourth step of the present process, therefore, the solution of sulfuric acid is first separated from the crystals of manganous chloride and then the separated solution of sulfuric acid is contacted in counter current relationship with a hot gas produced in the next or fifth step and containing hydrogen chloride whereby hydrogen chloride dissolved in the solution is escaped or stripped from the same. Simultaneously, the hot gas will transfer heat to the solution to be cooled down to a temperature required for the conversion reaction performed in the third step and the gas thus cooled is fed into the third step to serve to convert manganese sulfate into sulfuric acid and manganous chloride in the manner as previously described. In addition, the solution of sulfuric acid after having subject to stripping treatment will be concentrated.

Thus it will be appreciated that heat exchange is additionally effected in the fourth step with the result that the hot gas produced in the fifth step is cooled down to a temperature required for the conversion reaction performed in the third step, water vapor contained in the gas is condensed and separated, and that thermal economy is realized in concentration of the sulfuric acid solution after the same has been subjected to stripping treatment. It is to be noted that, in order to prevent the stripped solution of sulfuric acid from being diluted with water condensed and separated from the hot gas, the latter leaving the stripping stage should be maintained at a temperature above the dew point of the gas. To this end, that portion of the gas to be cooled below its dew point is required to be passed through an indirect heat exchanger. In other words, the gas leaving the stripping stage should indirectly transfer heat to the solution of sulfuric acid as by using an indirect heat exchanger whereby to pre-heat the solution of sulfuric acid and also to cool the hot gas.

In the final or fifth step the crystals of manganous chloride separated from sulfuric acid in the preceding step is contacted with a hot gas containing moisture and oxygen to regenerate hydrogen chloride and maganese oxide in accordance with the following equation.

$$2MnCl_2 \cdot 4H_2O + \tfrac{1}{2}O_2 \rightarrow Mn_2O_3 + 4HCl + 6H_2O$$

This reaction is preferably effected at a temperature of from 350° to 600° C. The water of crystallization in the crystals of manganous chloride can fully serve water required for performing the aforesaid reaction but the former water is lost adjacent 200° C. when the crystals are increased in temperature. This leads to the necessity of containing moisture in the gas to be contacted with the manganous chloride.

The regenerated manganese oxide is supplied to the first step where the same serves to absorb sulfur oxide while the regenerated hydrogen chloride is supplied to the fourth step where the same serves to strip hydrogen chloride from the solution of sulfuric acid as well as to transfer heat to the latter solution and thence to the third step, for the purpose of converting manganese sulfate into sulfuric acid and manganous chloride.

A batch test conducted at 450° C. for one hour yielded a conversion ratio of reaction of 97.0%.

Referring now to the drawing, there is illustrated an apparatus suitable for use in practicing the invention with the flows of various materials indicated by solid lines. A hot gas 1, such as a hot waste gas, containing sulfur oxide which is to be removed from the gas in accordance with the invention is caused to flow into a cooling tower 2 through its lower portion which tower is supplied with a coolant 3 such as water through its top. During its upward movement through the cooling tower 2 the flow of gas is cooled to a temperature as previously specified by having the coolant contacting therewith and dusts entrained by the same are washed away into a settling tank 4. The dusts are then discharged from the tank 4 as indicated by solid line 5 and that portion of the coolant entering the tank 4 is returned back to the cooling tower 2 as indicated by solid line 3'.

The gas cooled and free from any dust is fed into an absorber tower 6 through the lower portion and contacts an aqueous suspension of manganese oxide in counter current relationship whereby sulfur oxide contained in the gas is absorbed by manganese oxide. The gas thus treated is, as a harmless gas, exhausted through a chimney 7 to the surrounding atmosphere.

In order to prepare the aqueous suspension of manganese oxide, manganese oxide 8 and a mother liquor 8' originating from the succeeding stages are passed to a mixer vessel 9 to be admixed with each other. Further, supplementary feed water 8" is added to the mixture until manganese oxide has its concentration sufficient to maintain the fluidity of the aqueous suspension. The aqueous suspension of manganese oxide thus prepared is supplied to the absorber tower 6 as indicated by solid line 10 and the suspension 11 leaving the same is returned back to the mixer vessel 9. Thus the aqueous suspension of manganese oxide is recirculated through the absorber tower 6 and the mixer vessel 9. A portion of the so recirculated aqueous suspension is fed from the mixer vessel 9 to a centrifuge 12 where a not-reacted portion of manganese oxide 13 is separated from a solution of manganese sulfate 14. The separated manganese oxide 13 is returned back to the mixer vessel 9 while the solution of manganese sulfate 14 is passed to the subsequent crystallization and separation stage.

At the crystallization and separation stage, the solution of manganese sulfate 14 is first heated in a heater 15 to provide a super-saturated solution. The super-saturated solution enters a crystallizing vessel 16 where the manganese sulfate is deposited in the crystalline form. A solution 17 separated from the deposit is partly returned back to the heater 15 and partly to the mixer vessel 9 as the mother liquor 8'. A solution including the crystals of manganese sulfate suspended thereinto is passed to another centrifuge 18 where the crystals 19 are separated from a liquid 20 which, in turn, is as the mother liquor 8', returned back to the mixer vessel 9 as does the liquid 17. The separated crystals of manganese sulfate 19 are passed to the succeeding conversion stage.

At the conversion stage, the crystals of manganese sulfate 19 are passed through a reservoir 21 therefor to a multistage reaction tower 22 where the same is reacted with hydrogen chloride 23 fed from the succeeding stage to be converted into sulfuric acid and manganous chloride.

A solution of sulfuric acid and crystals of manganese chloride thus produced is fed into a centrifuge 24 where they are separated from each other. At the same time, concentrated hydrochloric acid 25 supplied to the centrifuge 24 washes away the portions of sulfuric acid adhering to the crystals of manganous chloride 26. Then the crystals 26 free from sulfuric acid are passed to the regeneration stage.

On the other hand, the separated solution of sulfuric acid 27 is fed successively into an indirect heat exchanger device 28 and a device for stripping hydrochloric acid 29. In these devices the solution is blown in counter current relationship into a flow of a hot gas containing hydrogen chloride supplied by the succeeding regeneration stage with the solution preheated in the exchanger and with hydrochloric acid dissolved in the solution being escaped or stripped from the same. Thus a concentrated solution of sulfuric acid 30 is yielded.

An aqueous solution of hydrochloric acid 25' condensed and separated from the gas in the heat exchanger device 28 is supplied to a reservoir 31 for hydrochloric acid which feeds to the centrifuge 24. On the other hand, the gas containing hydrogen chloride cooled in the devices 28 and 29 is supplied to the multistage reaction tower 22 as indicated by solid line 23 and participates in the conversion reaction as previously described. Thus the reaction tower 22 will discharge air 32, substantially free from hydrogen chloride to the surrounding atmosphere.

The crystals of manganous chloride 26 fed to the regeneration stage enters a heater 33 where the same is heated by heated air 34 supplied to the heater to thereby be dried. The dried crystals 26' are passed to a reaction furnace 35 which includes a flow of air mixture comprising the heated air 34' leaving the heater 33 and air 35 preheated by a heat exchanger 36. During its passage through the reaction furnace 35 manganous chloride is heated to be regenerated into manganese oxide and hydrogen chloride. The regenerated manganese oxide 37 is fed into the heat exchanger 36 where the same is cooled by the gas 39' containing oxygen. The cooled manganous oxide 37' then is returned back to the mixer vessel 9 as an absorbent, manganese oxide 8. A furnace gas 38 comprising a hot gas containing hydrogen chloride is fed through the stripper device 29 and the heat exchanger 28 as previously described to the reaction tower 22. As shown in the drawing, a flow of air 39 is supplied to the reservoir for hydrochloric acid 31 where it is moistened and then fed to the reaction tower 35 through the heat exchanger 36.

From the foregoing, it will be appreciated that the invention has provided a novel process of absorbing sulfur oxide contained in a waste gas, by an absorbent or manganese oxide to make the gas harmless, as well as efficiently regenerating manganese oxide and, without the necessity of separately using the step of producing sulfuric acid, producing the same simultaneously upon regenerating manganese oxide. In addition, hydrogen chloride serving as a conversion agent is regenerated and again used in regenerating manganese oxide with the result that hydrogen chloride is not lost in the cycle of operation. Thus the invention is greatly advantageous in that a gas containing sulfur oxide is continuously treated to be made harmless and simultaneously that sulfuric acid can be economically produced.

What we claim is:

1. A process of producing sulfuric acid from a gas containing a compound selected from the group consisting of sulfur dioxide and sulfur trioxide, comprising the steps of preparing an aqueous suspension of manganese oxide having its concentration sufficient to maintain the fluidity of the aqueous suspension, contacting the gas with the aqueous suspension of manganese oxide to absorb acidic oxygenated sulfur compounds contained in the gas by manganese oxide to thereby produce manganese sulfate, reacting the so produced manganese sulfate with hydrogen chloride at a temperature no greater than 50° C. to produce sulfuric acid and also to deposit manganous chloride in a crystalline form, and decomposing manganous chloride in the presence of water vapor and oxygen at an elevated temperature to convert the same into hydrogen chloride and manganese oxide, the last-mentioned hydrogen chloride and manganese oxide being returned back to the preceding steps of effecting production of sulfuric acid and deposition of manganous chloride, and preparing the aqueous suspension of manganese oxide respectively.

2. A process of producing sulfuric acid, comprising the steps of preparing an aqueous suspension including manganese sulfate in a crystalline form suspended in water, introducing a gas containing hydrogen chloride into the aqueous suspension at a temperature not exceeding 50° C. and preferably at room temperature to produce manganese chloride in a crystalline form and sulfuric acid, separating manganese chloride from sulfuric acid, and reacting the separated manganous chloride with oxygen and water vapor to oxidation-decompose the same into hydrogen chloride and manganese oxide at a temperature of from 350° to 600° C., the resulting gas containing hydrogen chloride being again used in producing manganous chloride from manganese sulfate.

3. A process as claimed in claim 1, comprising the step of contacting, in counter current relationship, sulfuric acid separated from manganous chloride, with a hot, hydrogen chloride-containing gas produced in the step of decomposing manganous chloride to thereby strip hydrogen chloride dissolved in sulfuric acid from the same, as well as concentrating sulfuric acid.

4. A process as claimed in claim 2, comprising the step of contacting, in counter current relationship, sulfuric acid separated from manganous chloride, with a hot, hydrogen chloride-containing gas produced in the step of oxidation decomposing manganous chloride to thereby strip hydrogen chloride dissolved in sulfuric acid from the same, as well as concentrating sulfuric acid.

5. A process as claimed in claim 1, comprising the step of contacting, in counter current relationship, sulfuric acid separated from manganous chloride, with a hot, hydrogen chloride-containing gas produced in the step of oxidation decomposing manganous chloride to thereby strip hydrogen chloride dissolved in sulfuric acid from the same, as well as concentrating sulfuric acid, said stripping being effected such that the gas leaves the stripping stage at its temperature above the dew point of the gas, the gas after having stripped hydrogen chloride from sulfuric acid transferring heat to sulfuric acid before subjected to stripping within an indirect heat exchanger whereby said sulfuric acid is preheated while said gas is cooled.

6. A process as claimed in claim 2, comprising the step of contacting, in counter current relationship, sulfuric acid separated from manganous chloride, with a hot, hydrogen chloride-containing gas produced in the step of oxidation decomposing manganous chloride to thereby strip hydrogen chloride dissolved in sulfuric acid from the same, as well as concentrating sulfuric acid, said stripping being effected such that the gas leaves the stripping stage at its temperature above the dew point of the gas, the gas after having stripped hydrogen chloride from sulfuric acid transferring heat to sulfuric acid before subjected to stripping within an indirect heat exchanger whereby said sulfuric acid is preheated while said gas is cooled.

7. A process as claimed in claim 1, comprising the steps of contacting, in counter current relationship, a sulfuric acid separated from manganous chloride, with a hot, hydrogen chloride-containing gas produced in the step of oxidation decomposing manganous chloride to thereby strip hydrogen chloride dissolved in sulfuric acid from the same as well as concentrating sulfuric acid, said stripping being effected such that the gas leaves the stripping stage at its temperature above the dew point of the gas, the gas after having stripped hydrogen chloride from sulfuric acid transferring heat to sulfuric acid before subjected to stripping within an indirect heat exchanger whereby said sulfuric acid is preheated while said gas is cooled, contacting air with hydrogen chloride containing water condensed in said indirect heat exchanger to produce air containing hydrogen chloride and moisture which, in turn, is supplied to the step of oxidation decomposing manganous chloride.

8. A process as claimed in claim 2, comprising the steps of contacting, in counter current relationship, sulfuric acid separated from manganous chloride, with a hot, hydrogen chloride-containing gas produced in the step of oxidation decomposing manganous chloride to thereby strip hydrogen chloride dissolved in sulfuric acid from the same as well as concentrating sulfuric acid, said stripping being effected such that the gas leaves the stripping stage at its temperature above the dew point of the gas, the gas after having stripped hydrogen chloride from sulfuric acid transferring heat to sulfuric acid before subjected to stripping within an indirect heat exchanger whereby said sulfuric acid is preheated while said gas is cooled, contacting air with hydrogen chloride containing water condensed in said indirect heat exchanger to produce air containing hydrogen chloride and moisture, which, in turn, is supplied to the step of oxidation decomposing manganous chloride.

References Cited by the Examiner

UNITED STATES PATENTS

| | | | |
|---|---|---|---|
| 348,348 | 8/1886 | Rumpf | 23—219 |
| 2,531,137 | 11/1950 | Laubi et al. | 23—167 |
| 3,150,923 | 9/1964 | Bienstock et al. | 23—178 |

OTHER REFERENCES

Tarbutton et al.: "Recovery of Sulfur Dioxide From Flue Gases," Industrial and Engineering Chemistry, vol. 49, No. 3, pp. 394–6.

Inorganic and Theoretical Chemistry, vol. 12, p. 411.

OSCAR R. VERTIZ, *Primary Examiner.*

MAURICE A. BRINDISI, *Examiner.*

R. M. DAVIDSON, *Assistant Examiner.*